United States Patent [19]

Mestdagh

[11] Patent Number: 5,768,318

[45] Date of Patent: Jun. 16, 1998

[54] SIGNAL PROCESSOR

[75] Inventor: Denis Julien Gilles Mestdagh, Brussels, Belgium

[73] Assignee: Alcatel N.V., Rijswijk, Netherlands

[21] Appl. No.: 560,938

[22] Filed: Nov. 20, 1995

[30] Foreign Application Priority Data

Dec. 22, 1994 [EP] European Pat. Off. ............. 94203724

[51] Int. Cl.$^6$ .................................................. H04K 1/02
[52] U.S. Cl. ................................................ 375/296; 375/317
[58] Field of Search ............................ 375/317, 318, 375/319, 346, 349, 297, 260, 233, 296; 455/126

[56] References Cited

U.S. PATENT DOCUMENTS

| | | | |
|---|---|---|---|
| 4,064,464 | 12/1977 | Morse | 330/53 |
| 4,438,511 | 3/1984 | Baran | 370/19 |
| 4,679,227 | 7/1987 | Hughes-Hartogs | 379/98 |
| 5,302,914 | 4/1994 | Arntz et al. | 330/129 |
| 5,530,920 | 6/1996 | Takeda | 455/102 |

FOREIGN PATENT DOCUMENTS 2270819  3/1994  United Kingdom .

OTHER PUBLICATIONS

International Conference on Communications 1,9 1994, 1 May 1994–May 5, 1994 IEEE, NY, pp. 293-300 Mestdagh et al. "Analysis of clipping effect in DMT–based ADSL systems".
Electronics Letters, 22 Jul. 1993, UK, vol. 29, No. 15, 22 Jul. 1993 ISSN 0013–5194, Mestdagh D.J. et al "Effect of amplitude clipping in DMT–ADSL transceivers".
Electronics Letters, 25 Nov. 1993, US, vol. 29, No. 24, 25 Nov. 1993 ISSN 0013–5194, Gross R. et al, "Clipping distortion in DMT ADSL systems".

Primary Examiner—Stephen Chin
Assistant Examiner—Kevin Kim
Attorney, Agent, or Firm—Ware, Fressola, Van Der Sluys & Adolphson, LLP

[57] ABSTRACT

The present invention discloses a so called Discrete Multi Tone or DMT signal processor which is coupled to a transmitting end of a communication line and which reduces the need for the clipping of the amplitude of the output signal OS'. The signal processor includes the cascade connection of a vector transformation circuit VTC, a modulator MOD and a peak detection circuit PDC. The VTC circuit is provided with a plurality of input vectors IN whereon a vector transformation is performed according to a signal at a control terminal (CT) of the peak detection circuit PDC which is indicative of the fact that the amplitude of the output signal OS provided by the modulator MOD exceeds a predetermined threshold value.

7 Claims, 2 Drawing Sheets

SIGNAL PROCESSOR

TECHNICAL FIELD

The present invention relates to a signal processor including first means adapted to provide an output signal which equals the sum of a plurality of modulated signals represented in a signal vector plane by a plurality of input vectors.

BACKGROUND OF THE INVENTION

Such a signal processor is already known in the art e.g. from the U.S. Pat. No. 4,679,227. Therein, the first means is referred to as a modulator which generates a digitally encoded time series or an output signal representing a waveform comprising the sum of quadrature amplitude modulated (QAM) carrier frequencies or modulated signals. The output signal is forwarded by the modulator to a digital-to-analog converter DAC which provides an analog output signal to an I/O interface coupled to a communication line.

The output signal may have large amplitude peaks or so called spikes due to constructive interference of the modulated signals which are summed. Consequently, the DAC converter needs to use a large number of bits to convert these spikes with sufficient precision. However, a large number of bits also means an expensive DAC. One may reduce the number of bits used by the DAC converter, by clipping the amplitude value of the output signal to a maximum value. In this way, the DAC converter becomes less expensive, but on the other hand there is a chance that information modulated on the QAM carrier frequencies is lost. Indeed, clipping the amplitude of the output signal is equivalent with changing the amplitude and/or phase of these carrier frequencies and thus it is equivalent with changing the information which is modulated on these QAM carrier frequencies as phase and amplitude variations.

It is thus clear that clipping is to be avoided as much as possible.

SUMMARY OF THE INVENTION

An object of the present invention is to provide a signal processor of the above known type, but which reduces the need for clipping of the output signal and which thus allows the use of a cheaper DAC converter without possible loss of information.

According to the present invention, this is achieved due to the fact that said signal processor further includes a cascade connection of third means, said first means and second means, said second means being adapted to activate a control signal at a control terminal thereof if the amplitude of said output signal exceeds a predetermined amplitude threshold, said third means being adapted to perform a predetermined transformation of said input vectors upon said control signal being activated, said second means further being adapted to provide said output signal at an output terminal of said signal processor.

Indeed, the amplitude value of the output signal is accurately modelled as a Gaussian Random Variable due to the fact that the output signal equals the sum of a plurality of modulated signals. The probability P that the amplitude of the output signal is bigger than the amplitude threshold and that the input vectors are transformed by the third means, is smaller than one, i.e. P<1. As a result, the first means provides an output signal for which the probability that the amplitude is larger than the amplitude threshold is P.P which is smaller than P. The latter probability is unconditional due to the predetermined transformation.

A characteristic feature of the invention is that said plurality of input vectors are represented in said signal vector plane by a plurality of orthogonal coordinate pairs and that said first means is adapted to process said output signal by means of an inverse fast fourier transformation of said plurality of orthogonal coordinate airs.

In this way, the first means provides the output signal in a very reliable way.

Another characteristic feature is that said predetermined transformation comprises a rotation in said signal vector plane of said input vectors over respective predetermined angles.

In this way, a simple transformation is achieved.

Yet another characteristic feature is that said predetermined transformation further comprises a multiplication of the amplitudes of said input vectors with respective predetermined factors, which realizes a more complex transformation.

A further characteristic is that said signal processor includes a counter register which is coupled between said second and said third means and which is incremented upon said control signal being activated, and that said output signal is provided at said output terminal by said second means if a value of said counter register exceeds a predetermined counter threshold.

As a result, the need for clipping the output signal is reduced even more. Indeed, the probability that the amplitude of the output signal which is provided after K input vector transformations, K being equal to the predetermined counter threshold, is P^K (P to the power K) which is even smaller than P.P i.e. P^K<<P<1.

Still another characteristic is that said predetermined transformation is performed according to said value of said counter register and that said third means is adapted to set a predetermined one of said input vectors in such a way as to being indicative of said value of said counter register.

In this way, the output signal contains information, i.e. the value of the counter register, concerning the predetermined transformation which is performed according to the latter value.

An advantage of the present invention is the fact that said second means further includes storage means adapted to store said output signal during a time period determined by said value of said counter register.

Indeed, the time delay between the input of the input vectors to the signal processor and the output of the output signal by the second means is constant if the above time period is properly determined for each value of the counter register. More, the time period T(M) for a value M of the counter register equals T(M+1) plus the time period needed by the third means to perform a transformation of the input vectors Tthird plus the time period needed by the first means to provide the output signal Tfirst i.e. T(M)=T(M+1)+Tthird+Tfirst.

A particular feature is that said storage means is adapted to store said output signal as a sequence of digital amplitude values, and that said second means is adapted to limit said digital amplitude values to said predetermined amplitude threshold.

In this way, a less expensive DAC converter may be used because the amplitude of the output signal is limited to the amplitude threshold value.

The above signal processor is coupled to the above mentioned communication line at the transmitting side. However, at the receiving side another signal processor complementary to the first one is coupled to the latter communication line. This complementary processor is adapted to process an input signal substantially equal to the above mentioned output signal provided by the signal processor coupled to the communication line at the transmitting side.

The present invention therefore further relates to a signal processor including first means adapted to provide a plurality of output vectors representing a plurality of modulated signals in a signal vector plane, an input signal of said signal processor being comprised of said modulated signals.

Characteristic features of this processor are that said signal processor includes the cascade connection of said first means and second means, said second means being adapted to perform a predetermined transformation of said output vectors according to a value indicated by a predetermined one of said output vectors; and that said plurality of output vectors are represented in said signal vector plane by a plurality of orthogonal coordinate pairs, and that said first means is adapted to process said plurality of orthogonal coordinate pairs by means of a fast fourier transform of said input signal. Finally, said predetermined transformation comprises a rotation in said signal vector plane of said output vectors over respective predetermined angles; and said predetermined transformation further comprises a multiplication of the amplitudes of said output vectors with respective predetermined factors.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
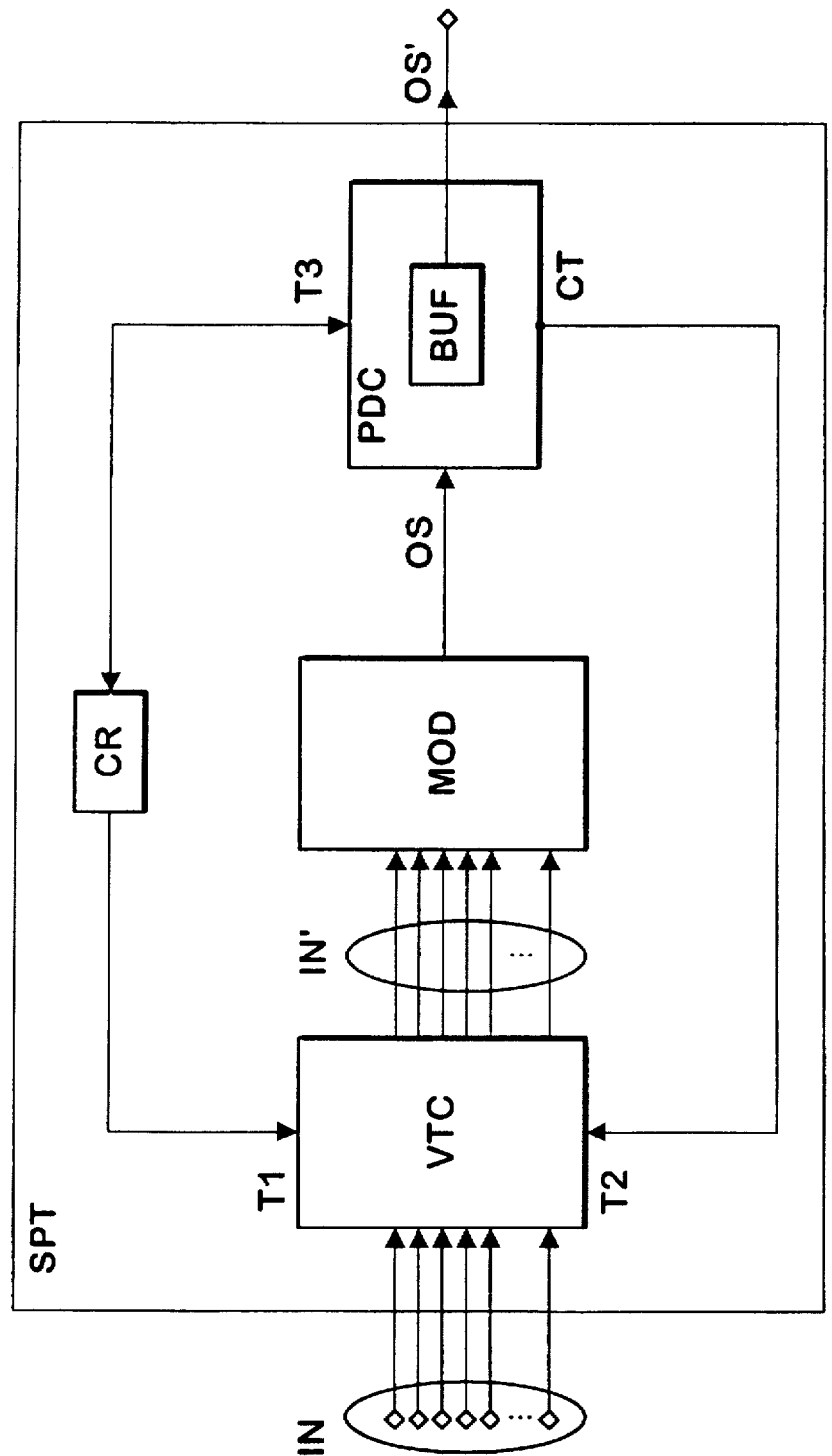
FIG. 1 shows a signal processor SPT according to the invention which is coupled to the transmitting side of a communication line.

Referring to FIG. 1, the signal processor SPT has a plurality of input terminals IN coupled to an output terminal OS' via the cascade connection of a vector transformation circuit VTC, a modulator MOD and a peak detection circuit PDC. An input/output terminal T3 of the PDC circuit is coupled via a counter register CR to an input terminal T1 of the VTC circuit. A control output terminal CT of the PDC circuit is further connected to an input terminal T2 of the VTC circuit.

Figure 2:
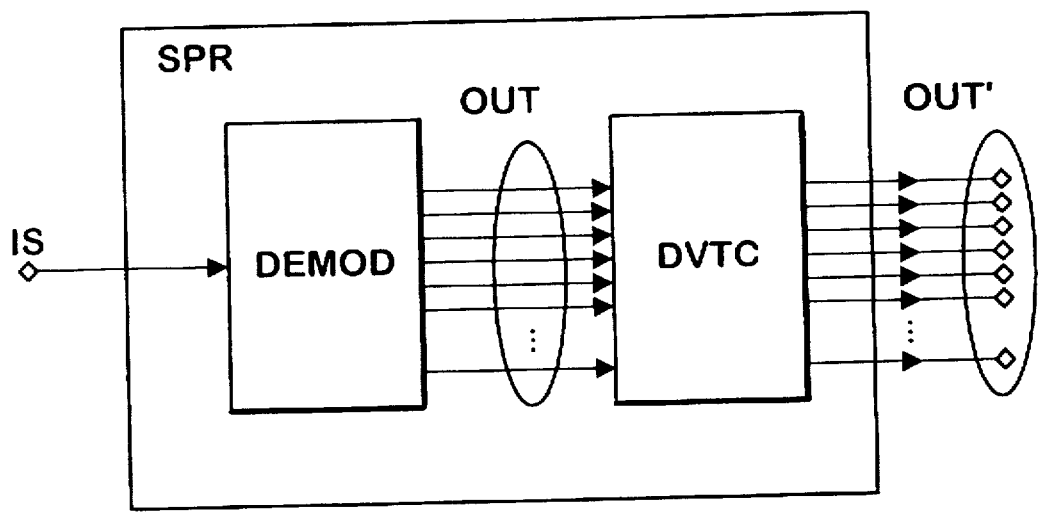
FIG. 2 shows a signal processor SPR coupled to the receiving side of the above communication line.

Referring to FIG. 2, the signal processor SPR has an input terminal IS coupled to a plurality of output terminals OUT' via the cascade connection of a demodulator DEMOD and a detection and vector transformation circuit DVTC. The operation of the signal processor SPT is hereafter described.

The signal processor SPT provides a so called Discrete Multi Tone or DMT signal OS' at its like named output terminal. The signal OS' equals the sum of a plurality of Quadrature Amplitude Modulated or QAM signals which are represented in a QAM signal vector plane by corresponding signal vectors or so called constellation points. The DMT technique is well described in the above mentioned U.S. patent.

These signal vectors are represented in the signal vector plane by orthogonal coordinate pairs IN which are input to the signal processor SPT via the like named plurality of input terminals. The initial value of the counter register CR is zero and the control terminal CT of the PDC circuit is set low. The VTC circuit sets the orthogonal coordinates of a predetermined one of the above signal vectors to predetermined values so that the latter predetermined input vector is indicative of the value of the CR register. It should be noted that the latter vector can not represent information other than the value of the counter register CR. When the value of the counter register is zero, the VTC circuit passes the orthogonal coordinated pairs IN', which are equal to the coordinate pairs IN except for the coordinate pair representing the above predetermined input vector, to the modulator MOD which performs an Inverse Fast Fourier Transform IFFT so as to provide an output signal OS which equals the sum of the above mentioned QAM signals. The modulation technique of the IFFT is well known to a person skilled in the art and is therefore not described in detail. The latter output signal OS comprises a series of digital amplitude values and is forwarded to the PDC circuit which detects the peak amplitude value. The latter peak amplitude value is then compared with a predetermined amplitude threshold value and the control signal provided at the control terminal CT is set low/high if the peak value is smaller/larger than the threshold value. Upon the control signal being set high, the PDC circuit also increments the counter register CR via its terminal T3.

If the latter control signal is set low, the output signal OS is stored in a buffer register BUF of the PDC circuit during a time interval T(M), M being the value of the CR register (in this case M=0) and the CR register is reset to zero via terminal T3. How to determine T(M) is described further on.

If the control signal is set high, the signal at the input terminal T2 of the VTC circuit is also set high upon which the VTC circuit sets the orthogonal coordinates of the above mentioned predetermined one of the above signal vectors to predetermined values indicative of the incremented value of the CR register. The above predetermined input vector is then again indicative of the latter value. Furthermore, the VTC circuit modifies the orthogonal coordinates of the other signal vectors so as to perform a vector transformation of the latter signal vectors. The vector transformation is a phase rotation of the signal vectors in the signal vector plane over corresponding angles which are determined for each signal vector by the value M of the CR register. It should be noted that the latter vector transformation may also comprise multiplication of the amplitudes of each signal vector with factors determined for each signal vector by the value M of the CR register. It should be noted that for each value M, a different transformation is performed.

The modified orthogonal coordinate pairs are then forwarded to the modulator which perforins the IFFT tranformation to provide another output signal OS which is passed to the PDC circuit. The PDC circuit then checks if the value of the CR register is smaller/equal to a counter threshold value. In case the value of the CR register is smaller than the latter threshold value, the PDC circuit operates as described above, i.e. stores the output signal in the buffer register BUF during a time period T(M). In case the value of the CR register is equal to the counter threshold value, the PDC circuit clips the amplitude of the output signal to a predetermined amplitude threshold Athres and forwards the output signal to the output terminal OS' of the SPT processor, the CR register is reset to zero and the control signal at terminal CT is set low. In this way, only a limited number of vector transformations are performed on the same plurality of input vectors and the amplitude of the output signal is limited to the amplitude threshold value.

With respect to the time interval T(M) that the output signal OS is stored in the buffer register BUF of the PDC circuit for a value M of the CR register, the following is to be noted : T(M+1)=T(M)−Tvtc−Tmod, i.e. the time interval T(M+1) for a value M+1 of the CR register equals T(M) minus the time needed to perform a vector transformation in the VTC circuit and minus the time to perform an IFFT transformation in the modulator MOD. In this way, the signal processor SPT provides the output signal at its terminal OS' after a constant time interval since the input of the plurality of orthogonal coordinate pairs to the signal processor SPT.

The advantage of the operation of such a signal processor SPT is now briefly explained with reference to the article 'Effect of amplitude clipping in DMT-ADSL transceivers' in Electronic Letters 22nd Jul. 1993 Vol. 29 No. 15 page 1354 and 1355 by D. Mestdagh, J. Spruyt and B. Biran. The output signal OS equals the sum of N QAM signals. For large values of N, say N>=10, the amplitude of the output signal is accurately modelled as a Gaussian Random Value with a zero mean value. After the first pass through the signal processor SPT, the modulator MOD provides an output signal OS for which the probability that its amplitude is larger than the threshold amplitude Athres, is P. For the amplitude which is a Gaussian Random Value, this probability is readily determined by a person skilled in the art. If Mmax vector transformations are performed on the same plurality of input vectors, the probability that the amplitude of the output signal OS provided by the modulator MOD after Mmax passes, is larger than the amplitude threshold Athres, is P^Mmax (P to the power Mmax). Indeed, this probability is unconditional due to Mmax consecutive vector transformations which are independent of each other. As P<1 it is obvious that P^Mmax<<P.

The signal processor SPT is coupled to a digital-to-analog DAC converter which uses B1 bits to represent the amplitude values of the output signal provided by the SPT processor. The use of the above signal processor SPT reduces the probability that the amplitude of the output signal OS is larger than the amplitude threshold Athres. Consequently, the amplitude value may be clipped to the latter amplitude threshold so that the DAC converter can use B2 bits instead of B1 bits, B2 being smaller than B1, without signal quality loss. The signal quality is measured as noise to signal ratio (N/S) and (N/S)__B1 (__B2) is readily determined by a person skilled in the art for the DAC using B1 (B2) bits for a maximum amplitude Amax (Athres). However, the clipping of the amplitude introduces extra noise and the noise to signal ratio (N/S)__clip due to the clipping is also easily deducted by someone skilled in the art, from the probability distribution of the amplitude of the output signal OS. In order to maintain the same signal quality the following condition (1) must be satisfied:

(N/S)__B1=>(N/S)__B2 +(N/S)__clip__Mmax.

(N/S)__clip__Mmax being the noise-to-signal ratio caused by clipping of the amplitude of the output signal OS after Mmax vector transformations. Developing this equation results in a relation between Athres,Amax,B1 and B2 whereby the choice of Athres is related to the probability distribution of the amplitude of the output signal OS and related to the number of vector transformations performed by the VTC circuit i.e. Mmax. Moreover, the values of Athres and of Mmax directly affect the value of (N/S)__clip__Mmax.

As a result of the above, the use of the signal processor SPT according to the invention reduces the probability that the amplitude of the output signal OS is larger than the amplitude threshold, therefore the amplitude value may be clipped to the amplitude threshold value and the DAC coupled after the signal processor SPT only needs B2 bits to cover the amplitude range. All this is possible without signal quality loss as explained above. It should be noted that Athres may be chosen as a function of the number of vector transformations Mmax.

The output signal provided at the output terminal OS' of the SPT processor is converted to an analog signal in the DAC converter (not shown) and is transmitted over a communication line (not shown) coupled to the DAC converter via an interface circuit (not shown). At the other end of the communication line, a similar interface circuit (not shown) couples the communication line to an analog-to-digital ADC converter (not shown) which supplies an input signal, substantially like the above output signal, to the input terminal IS of the signal processor SPR as shown in FIG. 2. The operation of the signal processor SPR shown in FIG. 2 is hereafter described.

The demodulator DEMOD performs a so called Fast Fourier Transformation on the input signal and provides a plurality of orthogonal coordinate pairs OUT at a like named plurality of output terminals. These coordinate pairs represent a corresponding plurality of signal vectors in the above mentioned signal vector plane. The signal vectors represent QAM modulated signals the sum of which equals the input signal. The coordinate pairs OUT are passed to the detection and vector transformation circuit DVTC.

The DVTC circuit first of all detects which value is indicated by the signal vector represented by a predetermined one of the coordinate pairs. This is done by means of comparing the coordinate values of the latter predetermined coordinate pair, with predetermined coordinate values which are each indicative of a value like the above value and which are substantially equal to the above mentioned predetermined values indicative of the value of the CR register. The DVTC circuit then modifies all the other orthogonal coordinate pairs according to the above value so as to perform the inverse transformation of the above mentioned vector transformation performed by the VTC circuit of the SPT processor. Finally the DVTC circuit provides the modified orthogonal coordinate pairs at the output terminals OUT' of the SPR processor.

It is shown that at the receiving side of the communication line there is no signal quality loss caused by the use of a B2 bits ADC converter coupled to the SPR signal processor.

The analog output signal which is supplied to the communication line via the interface circuit by the B2 bits DAC converter, is submitted to phase distortion while propagating over the latter communication line. This process is equivalent to performing a vector transformation on the signal vectors representing the above mentioned QAM signals. Consequently, the probability that the amplitude of the signal which is provided to the ADC converter by the interface circuit at the receiving side of the communication line, is larger than the amplitude threshold Athres which is the maximum range of the B2 bits ADC converter, is P. Indeed, although the amplitude of the output signal is limited to the amplitude threshold at the transmitting side of the communication line, it is to be considered that the amplitude of the output signal received at the receiving side of the line may be larger then the amplitude threshold because the propagation over the latter line is equivalent to a vector transformation. In order to avoid signal quality loss at the receiving side of the communication line we thus have the condition (2):

$$(N/S)\_{B2+(N/S)\_{clip\_1}} <= (N/S)\_B1,$$

which is like the condition at the transmitting side of the line. Indeed, the use of a B2 bits converter involves clipping of the amplitude and as explained above this introduces a noise to signal ratio (N/S)_clip_1 caused by the clipping of the amplitude after the propagation over the communication line which is equivalent of one single vector transformation. It should be noted that:

$$(N/S)\_clip\_n2 = (N/S)\_clip\_n1 \cdot P'(n1-n2),$$

P being the above mentioned probability that the amplitude is larger than Athres. The combination of (1) and (2) results in:

$$2(N/S)\_B1 >= 2(N/S)\_B2 + (N/S)\_clip\_Mmax + (N/S)\_clip\_1.$$

or $$2(N/S)\_B1 >= 2(N/S)\_B2 + (N/S)\_clip\_1 \cdot (1 + P'(Mmax-1))$$

which may be simplified to $$2(N/S)\_{B1} >= 2(N/S)\_B2 + (N/S)\_clip\_1$$

because $P'(Mmax-1) << 1$.

So, the overall operation of the SPR and SPT processors allows the use of less expensive DAC and ADC converters without signal quality being lost if conditions (1) and (2) are fullfilled.

It should be noted that the received signal may be attenuated due to the propagation over the communication line. Therefore, a so called automatic gain control or AGC circuit is coupled before the ADC converter so as to compensate this attenuation with a corresponding amplification of the received signal.

If an echo canceller (not shown) is used in the digital domain, i.e. coupled to the output terminal of the SPR processor, a like condition may be derived for the echoed signal. Let us suppose that a large analog echo signal is added to the received DMT signal. The latter analog echo signal is e.g. an attenuated part of another DMT signal which is transmitted on the same communication line but in the opposite direction of the received DMT signal. This other DMT signal is provided by another SPT processor (not shown) which is also coupled to this echo canceller. Consequently, the signal which is supplied by the above AGC circuit to the ADC converter contains a large echo component and a much smaller received DMT signal component. Suppose that the range and bit precision of the DAC and ADC converters is identical, then it is clear that the full range of the DAC converter can not be used because the ADC converter needs enough precision for the sum of the echo signal and the received signal together. As the echo signal is not subjected to any phase distortion, and thus no extra vector transformation, the echo signal is not clipped at the ADC converter. For the path of the echo signal the following condition has to be fulfilled in order to maintain the same signal quality for the echoed signal:

$$2(N/S)\_B1 >= 2(N/S)\_B2 + (N/S)\_clip\_Mmax.$$

It is important to notice that the (N/S)_B2 (_B1) is calculated for the maximum amplitude which may be converted by the DAC or ADC converters and not for the amplitude threshold Athres ! Consequently, in case of an echo cancellation scheme the number of bits used by the ADC and DAC converters may be reduced even more. Indeed, the gain in number of bits is readily obtained as 2_log(Athres_n1/Athres_n2), Athres_x being the threshold amplitude determined for x vector transformations and n1<n2.

It should be noted that in the above mentioned echo cancelling scheme the DAC is over dimensioned. It is clear that the latter overdimensioning of the bit precision may be optimised.

While the principles of the invention have been described above in connection with specific apparatus, it is to be clearly understood that this description is made only by way of example and not as a limitation on the scope of the invention.

I claim:

1. A signal processor (SPT) including first means (MOD) adapted to provide an output signal (OS') which equals the sum of a plurality of modulated signals represented in a signal vector plane by a plurality of input vectors (IN), said signal processor further includes a cascade connection of third means (VTC), said first means and second means (PDC), said second means being adapted to activate a control signal at a control terminal thereof (CT) if the amplitude of said output signal exceeds a predetermined amplitude threshold, said third means being adapted to perform a predetermined transformation of said input vectors upon said control signal being activated, and said second means further being adapted to provide said output signal at an output terminal of said signal processor, said predetermined transformation comprising a rotation in said signal vector plane of said input vectors over respective predetermined angles, and a multiplication of the amplitudes of said input vectors with respective predetermined factors.

2. A signal processor according to claim 1, characterized in that said signal processor includes a counter register (CR) which is coupled between said second and said third means and which is incremented upon said control signal being activated, and that said output signal is provided at said output terminal by said second means if a value of said counter register exceeds a predetermined counter threshold.

3. A signal processor according to claim 2, characterized in that said predetermined transformation is performed according to said value of said counter register and that said third means is adapted to set a predetermined one of said input vectors in such a way as to be indicative of said value of said counter register.

4. A signal processor according to claim 2, characterized in that said second means further includes storage means (BUF) adapted to store said output signal during a time period determined by said value of said counter register.

5. A signal processor according to claim 4, characterized in that said storage means is adapted to store said output signal as a sequence of digital amplitude values, and that said second means is adapted to limit said digital amplitude values to said predetermined amplitude threshold.

6. A signal processor (SPR) including first means (DEMOD) adapted to provide a plurality of output vectors (OUT) representing a plurality of modulated signals in a signal vector plane, an input signal (IS) of said signal processor being comprised of said modulated signals, said signal processor further includes the cascade connection of said first means and second means (DVTC), said second means being adapted to perform a predetermined transformation of said output vectors, said predetermined transformation comprising a rotation in said signal vector plane of said output vectors over respective predetermined angles, and a multiplication of the amplitudes of said output vectors with respective predetermined factors.

7. A signal processor according to claim 6, characterized in that said transformation depends on a value retrieved from a predetermined one of said output vectors.

* * * * *